Oct. 5, 1965          D. W. RUDD          3,210,162
APPARATUS FOR USE IN EFFECTING CHEMICAL REACTIONS
Filed Nov. 1, 1961
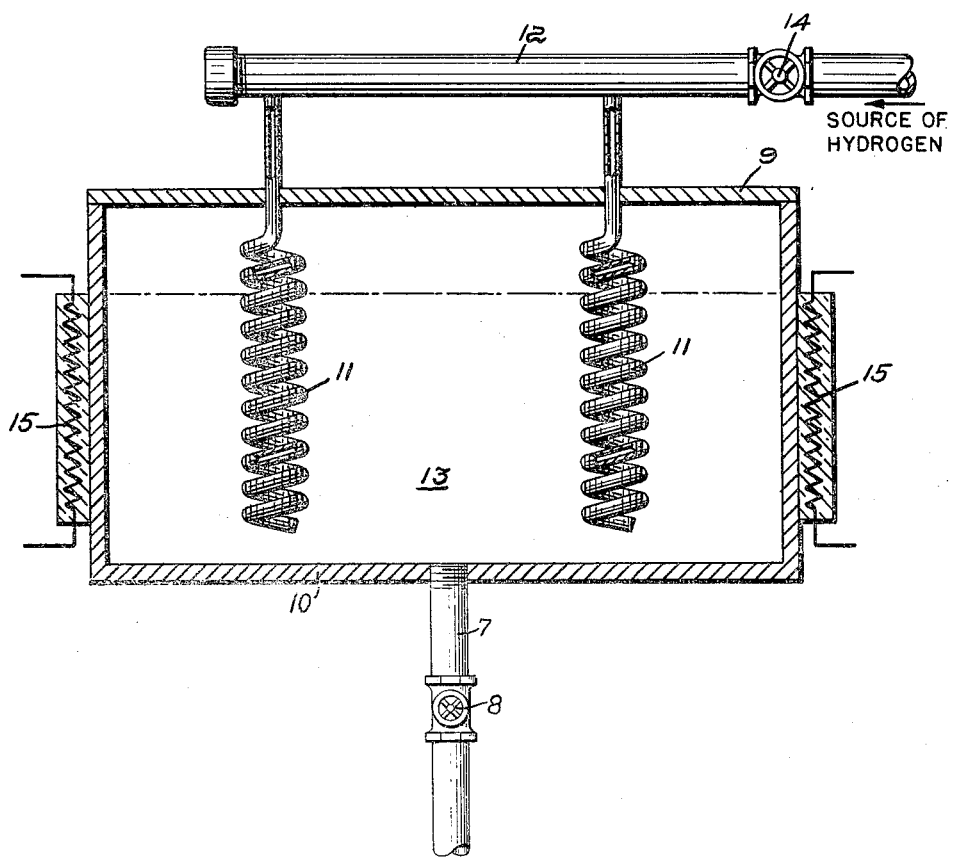
Inventor:
David W. Rudd,
by J. Harold Boss
Attorney

United States Patent Office 3,210,162
Patented Oct. 5, 1965

3,210,162
APPARATUS FOR USE IN EFFECTING
CHEMICAL REACTIONS
David W. Rudd, Saugus, Mass., assignor to Metal
Hydrides Incorporated, Beverly, Mass., a company
incorporated of Massachusetts
Filed Nov. 1, 1961, Ser. No. 149,260
2 Claims. (Cl. 23—285)

This invention relates to hydrogenation of chemical compounds and more particularly to an improved apparatus for effecting a chemical reaction which involves bringing atomic hydrogen in contact with another chemical compound.

Heretofore, hydrogenation has been effected in an apparatus as a diaphragm hydrogenator which comprises two chambers separated by a metal sheet of catalyst such as a palladium diaphragm. This diaphragm is charged with atomic hydrogen on one side and is discharged on the reverse side as the co-reactant hydrogenates to the desired product. The diaphragm performs three functions: (a) it collects atomic hydrogen on the charging side without interference from other substances such as co-reactants or products; (b) it transfers the atomic hydrogen to the consuming side from the charging side; (c) it catalytically hydrogenates the co-reactant introduced on the consuming side. One method of charging the diaphragm with atomic hydrogen is to make the charging side of the diaphragm a cathode in a suitable electrolyte such as a pure solution of sulfuric acid and water. The atomic hydrogen on the consuming side may be sufficiently active to hydrogenate the co-reactant without need of the application of activation energy in the form of heat. In case the co-reactant employed on the consuming side is a negative ion, the hydrogenation process may be aided by utilizing electrolysis on the consuming side of the diaphragm. In this case, the diaphragm serves as a cathode on the charging side and as an anode on the consuming side. The diaphragm hydrogenator is not well adapted for large scale operations and the activity of the atomic hydrogen utilized therein is not as great as desired.

The present invention contemplates an improved apparatus for use in effecting a chemical reaction which involves bringing atomic hydrogen in contact with a co-reactant. The apparatus is adapted for large scale operations and also is adapted to generate atomic hydrogen in a state of high activity and bring it in contact with a co-reactant. The invention utilizes the known fact that when molecular hydrogen is confined in contact with a metal, hydrogen passes through the metal and in so doing is dissociated to atomic hydrogen. Atomic hydrogen produced in this manner possesses, in addition to the energy required to dissociate the molecule, the energy required to force the atom through the metal.

In its broad aspect the apparatus of the invention comprises means for introducing molecular hydrogen into one or more confined zones at least a portion of each of which is bounded by a metal which separates the confined zone or zones from a reaction zone adapted to receive the co-reactant. More specifically, in its preferred form the apparatus comprises a plurality of hollow metal coils extending into a reaction zone and connected with a source of hydrogen under pressure, the metal coils preferably being formed of a metal possessing catalytic properties, such as palladium.

The invention is illustrated further by the following description in conjunction with the accompanying drawing in which the single figure is an elevational view, partly in section, of an apparatus embodying the invention. The apparatus illustrated in the drawing comprises a reaction vessel 10 provided with means (not shown) for introducing a co-reactant and a conduit 7 provided with a valve 8 for removing reacted product. If desired, the vessel may be provided with a hermetically sealed closure 9. A plurality of hollow metal coils 11 are connected to a conduit 12 for communication therewith and extend into the reaction vessel 10 to engage the co-reactant 13 therein. The conduit 12 is connected to a source of hydrogen under pressure (not shown) and is provided with a valve 14 for adjusting the pressure of the hydrogen admitted to the coils 11. Suitable means is provided for heating the reaction vessel 10 such as an electrical heating coil 15. The coils 11 may be formed of any metal which diffuses hydrogen under the desired reaction conditions but preferably are formed of a metal having catalytic properties, such as palladium.

The invention is illustrated further by the following examples:

Example 1

In this example, the apparatus used was that illustrated in the drawing except that it had a single palladium coil. Ethylene was admitted to the reaction vessel 10 under a pressure of one atmosphere and the vessel heated to 200° C. Hydrogen was admitted to the palladium coil under a pressure of 25 pounds per square inch. At the end of 20 hours the contents of the reaction vessel 10 were discharged. The infrared absorption spectra showed the ethylene had been reduced to ethane.

Example 2

The apparatus used in this example was the same as that used in Example 1. Hydrogen was admitted to the palladium coil under a pressure of 80 p.s.i. Styrene was placed in the reaction vessel 10 and the latter heated to a temperature between 100° C. and 120° C. for 20 hours. At the end of this time the contents of the reaction vessel were poured into methanol and the polystyrene residue removed.

Example 3

The apparatus used in this example consisted of a metal cylinder in the center of which was a flat disc that separates the cylinder into two sections. Two of these cylinders were fabricated of Hastelloy B. Both were heated under vacuum to 700°. The disc in one of the cylinders was exposed to air in such a manner that one face of the disc became oxidized. After this treatment, both cylinders were filled with hydrogen in such a manner that hydrogen was in contact with that face of the disc of the second cylinder which was not oxidized. After 12 hours both discs showed the same permeability characteristics, showing that the oxide of the second cylinder had been completely reduced. This was also verified by visual inspection. This example demonstrates the use of the invention to reduce oxides and to clean metal surfaces from various oxides.

I claim:

1. In an apparatus for use in effecting a chemical reaction which involves bringing atomic hydrogen in contact with a co-reactant, said apparatus having means providing a reaction zone adapted to receive said co-reactant and means for bringing atomic hydrogen in contact with said co-reactant and means for removing the reaction product from the reaction zone, the improvement which comprises a hollow metal coil extending into said reaction zone, said coil being closed at one end, and means for introducing molecular hydrogen into said coil through its other end under pressure sufficient to cause it to pass from the interior of said hollow metal coil and enter said reaction zone in the form of atomic hydrogen.

2. An apparatus as claimed by claim 1 wherein said hollow metal coil is palladium.

References Cited by the Examiner

UNITED STATES PATENTS

| | | | |
|---|---|---|---|
| 410,067 | 8/89 | Bower. | |
| 503,556 | 8/93 | Solvay | 23—284 |
| 1,565,366 | 12/25 | Howard | 23—285 |
| 1,685,759 | 9/28 | Walter | 23—1 |
| 2,536,610 | 1/51 | King et al. | 55—158 |
| 2,670,275 | 2/54 | Olson. | |
| 2,768,061 | 10/56 | Cook et al. | 23—153 |

OTHER REFERENCES

Bolletino delle privative Industrial: del regno l'Italia, 2a Serie, vol. 20, Tavole, Anno 1889, Tav. CLXXXVII, Bower Henry.

MORRIS W. WOLK, *Primary Examiner.*

MAURICE A. BRINDISI, *Examiner.*